United States Patent [19]
Piatt

[11] Patent Number: 4,759,646
[45] Date of Patent: Jul. 26, 1988

[54] COMPACT BATTERY-POWERED PRINTER

[75] Inventor: Michael J. Piatt, Enon, Ohio

[73] Assignee: Eastman Kodak Company, Rochester, N.Y.

[21] Appl. No.: 855,287

[22] Filed: Apr. 24, 1986

[51] Int. Cl.[4] .............................................. B41J 3/36
[52] U.S. Cl. ..................................... 400/88; 400/568; 400/660.3
[58] Field of Search .............. 400/88, 648, 659, 660.3, 400/662, 145.2, 568

[56] References Cited
U.S. PATENT DOCUMENTS

| | | | |
|---|---|---|---|
| 2,353,194 | 7/1944 | Sherman et al. | 400/660.3 X |
| 3,344,899 | 10/1967 | Wang et al. | 197/12 |
| 3,393,789 | 7/1968 | Keiter | 400/659 X |
| 3,920,479 | 11/1975 | Westberg et al. | 400/88 X |
| 4,143,382 | 3/1979 | Brill et al. | 400/88 X |
| 4,450,454 | 5/1984 | Koto | 346/140 R |
| 4,586,838 | 5/1986 | Hora et al. | 400/88 X |
| 4,589,787 | 5/1986 | Seki et al. | 400/145.2 |

FOREIGN PATENT DOCUMENTS 11268 1/1984 Japan .................................... 400/659

OTHER PUBLICATIONS

IBM Tech. Disc. Bulletin, "Self-Contained Platen Motor", Anderson, vol. 24, No. 9, Feb. 1982, pp. 4856–4857.
IBM Tech. Disc. Bulletin, "Handle Used as Battery Compartment", vol. 27, No. 11, Apr. 1985, pp. 6692–6693.
IBM Tech. Disc. Bulletin, "Safe Personal Computer Battery Mount Housing", vol. 28, No. 1, Jun. 1985, pp. 84–86.

Primary Examiner—Paul T. Sewell
Assistant Examiner—James R. McDaniel
Attorney, Agent, or Firm—John D. Husser

[57] ABSTRACT

A portion of print medium transport system of an electrically operable printer is constructed to house battery power sources. This construction enables size reduction of the printer. Disclosed embodiments include housing cylindrical batteries in a printer platen and housing batteries of other configurations in sheet guide structure of the printer.

15 Claims, 7 Drawing Sheets

FIG. 11
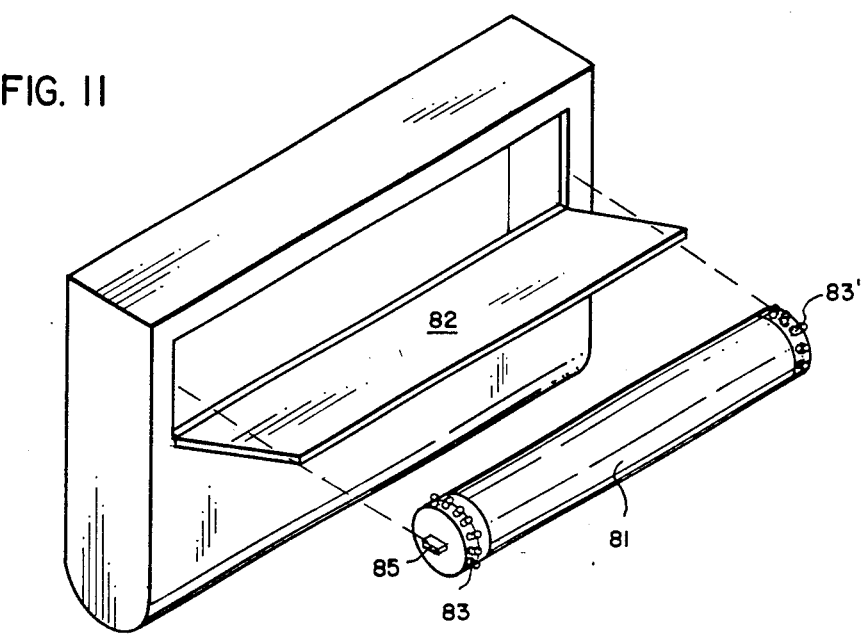
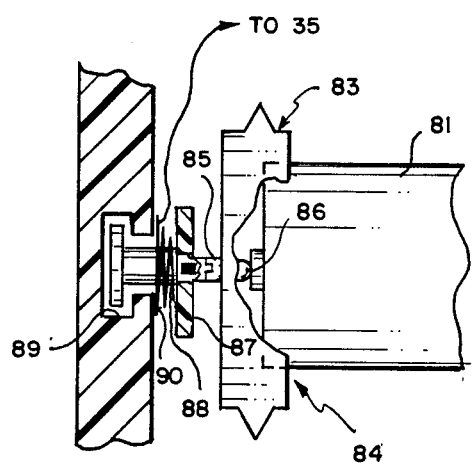
FIG. 12

COMPACT BATTERY-POWERED PRINTER

BACKGROUND OF THE INVENTION

1. Field of Invention

The present invention relates to battery-powered printing apparatus, and more particularly to a space-economizing construction for such apparatus.

2. Description of Prior Art

As devices such as personal computers and word processors have become more numerous and smaller, there has arisen a concurrent desire to provide smaller output printers for those devices. Such output printers use various printing technologies, e.g. impression or dot matrix impacting, thermal dye transferring and ink jet printing such as piezoelectric or thermal drop on demand devices. A common requirement for output printers using the above or other printing technologies is an electrical power source.

U.S. Pat. No. 3,344,899 points out that it is highly advantageous for such data transferring machines to be "portable", implying that the machines desirably incorporate their own source of electrical power. However, even with the improvements that have been incorporated into small batteries, the power requirements for operating such output printers necessitates either: (i) the dedication of considerable volume within a printer housing or (ii) the approach of using a separate portable power supply. Neither of these alternatives is attractive from the viewpoint of the consumer who wishes maximum capability with the minimum baggage.

SUMMARY OF THE INVENTION

Thus an important purpose of the present invention is to provide improved configurations which contribute significantly toward enhanced compactness in a battery-operable printer. The invention is advantageous from the viewpoint of providing the user a more readily portable output printer, e.g. easily fitting within a portion of a briefcase. The invention also is advantageous in providing adequate power for such a printer in reliably operable construction. Further, the present invention provides a conveniently located battery housing and an easily effected mode of battery installation.

The above and other objects are accomplished, in accord with the present invention by providing in a printer of the kind having electrically powered printing components and a print medium transport means, such as a feeding and/or guiding member, an improved power supply construction that comprises a battery housing formed within such transport means, terminals couplable to batteries inserted in such housing and circuit means connecting those terminals to electrically operated components of the output printer.

BRIEF DESCRIPTION OF THE DRAWINGS

The subsequent description of preferred embodiments is set forth with reference to the attached drawings wherein:

FIG. 11 is a perspective view of another embodiment of the invention; and

FIG. 12 is a cross-sectional view of a portion of the FIG. 11 embodiment.

DETAILED DESCRIPTION OF THE PREFERRED EMBODIMENTS

Figure 1:
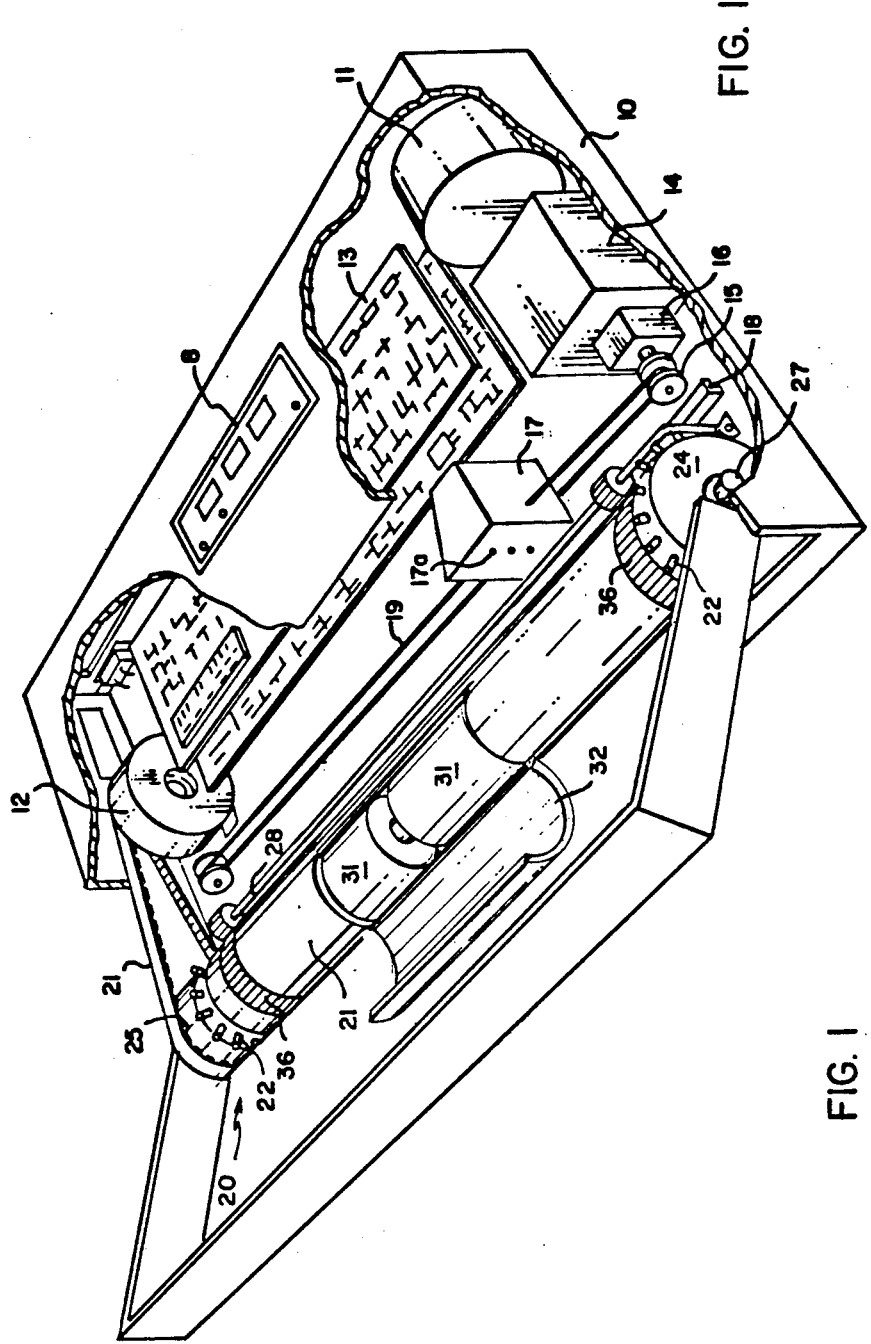
FIG. 1 is a perspective view of printer apparatus incorporating one preferred embodiment of the present invention.

In general, the exemplary printer embodiment shown in FIG. 1 comprises a main housing 10 within which are mounted print head motor 11, platen motor 12, and printing and drive control circuit boards 13. The motor 11 is coupled via a gear reduction drive (shown generally as 14) to a cable drive spindle 15 housed in journal 16. Rotation of motor 11 traverses print head assembly 17 along its support bar 18 by virtue of its coupling to one strand of endless drive cable 19. Motor 12 is coupled to the print media transport system 20 by gear means, e.g. a gear train or geared drive belt 29. The transport system 20 is described in greater detail below, however, in general it functions to move print medium, e.g. paper, past the transversing printing path of the print head 17. Thus, under control of circuits 13, print sheet portions are sequentially indexed and the print head traverses across the indexed portion to effect printing, e.g. by ejected ink drops, selective thermal heating or by impact printing. That is, the ink jet print head 17 (with ejection orifices 17a) is only exemplary of various printing technologies with which the present invention is useful.

Figure 2:
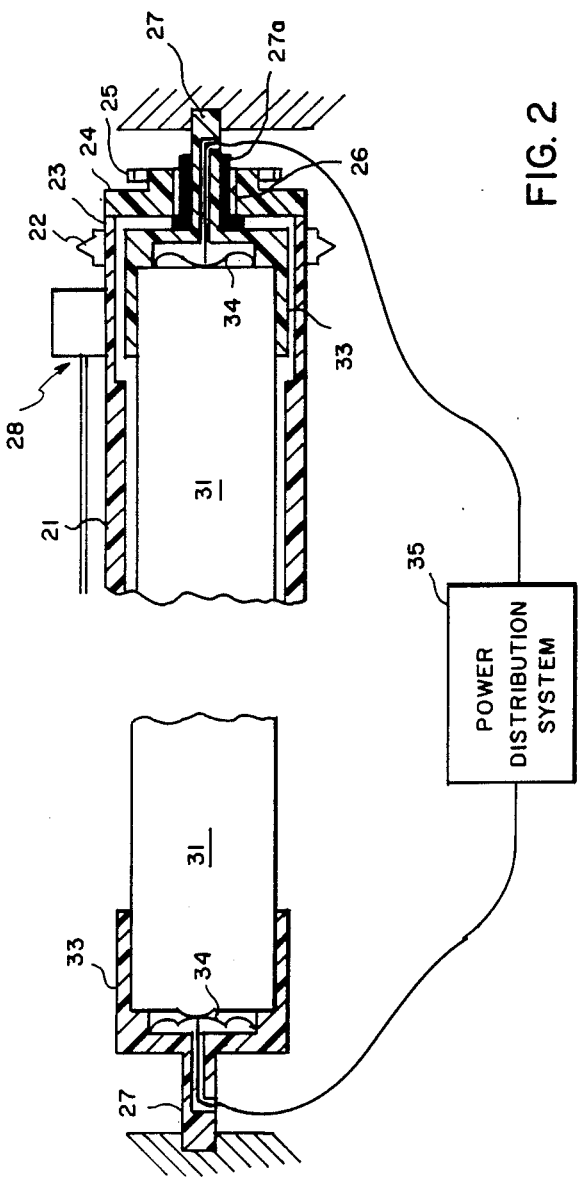
FIG. 2 is a cross-sectional view of a portion of the apparatus shown in FIG. 1.

Referring now to FIG. 2, as well as FIG. 1, it can be seen that the printer of this embodiment of the invention comprises a rotatable platen 21 having thereon sprocket teeth 22 which are constructed for advancing tractor-fed paper types. The ends 23 of the platen are coupled to end plates 24, one of which has a drive gear 25 adapted to mesh with gear means 29. Both end plates 24 have bearing surfaces 26 adapted to support the platen for rotation on the journal surface 27a of shaft 27. A bail assembly 28 is mounted within the printer to engage friction surfaces 36 of the platen in a known manner.

In the embodiment of the present invention shown in FIGS. 1 and 2, the transport system 20 is constructed to house a source by battery power for operating the printer. Specifically, platen 21 is formed as a hollow shell adapted to move around a plurality of cylindrical batteries 31, e.g. five nickel-cadmium "C" size batteries, connected in series. As shown in FIG. 1, the platen 21 comprises an access door 32, which is openable for insertion of the individual batteries and is hinged internally of the platen so as to present a smooth cylindrical surface when closed. After insertion through door 32, the front and rear batteries of the series are moved into supporting engagement with complementary shaped end caps 33, here formed as integral portions of journal shafts 27. As shown in FIG. 2, both end caps contain contact springs 34 which are adapted to make electrical connection with the terminals of inserted batteries and which are coupled to the power distribution system 35 for the printer. From system 35 electrical energy is supplied via portions of control panels 13 to motors 11 and 12, print head 17 and other electrically energized portions of the printer, e.g. execution panel 8, detection and interface electronics of the printer.

In operation of the printer shown in FIGS. 1 and 2, the batteries 31 do not rotate with the platen 21. This is advantageous from the viewpoints of minimizing drive energy and eliminating the necessity of brush contacts. Also, the approach of stationary batteries decreases the momentum of the platen, which is particularly useful in achieving accurate indexing of the platen, and thus the print medium. Thus, rotation of the platen will advance edge-perforated paper print medium via sprockets 22 or individual sheets via the pinching engagement between the roller of bail 28 and the opposing platen surface, which can have a rubber surfacing shown at 36 in FIG. 1.

Figure 3:
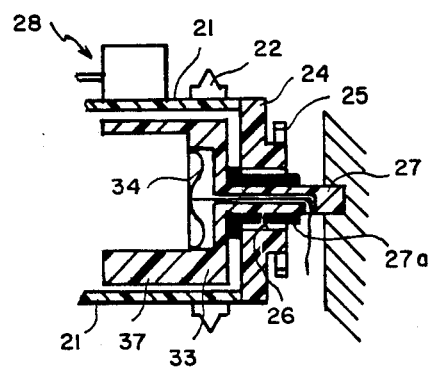
FIG. 3 is a cross-sectional view similar to FIG. 2, but showing an alternative embodiment of the present invention.

FIG. 3 discloses an advantageous modification of the previously described embodiment wherein the support caps 33 are joined by an arcuate support shelf 37 that extends between the lower sectors of the caps within the bottom of the platen 21. In this embodiment, all batteries nest in the shelf 37 to prevent rubbing between inserted batteries and the rotating platen 21.

Figure 4:
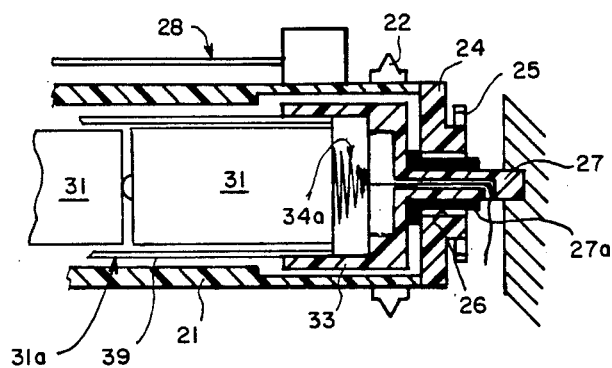
FIG. 4 is a cross-sectional view similar to FIG. 2, but showing an alternative embodiment of the present invention.

FIG. 4 illustrates another embodiment of the present invention wherein non-rubbing support of the batteries is effected by cooperation of end caps 33 and a battery package which retains the series connected batteries in a "stick" format 31a by encapsulating wall member 39. Such multi-battery packages are commercially available, e.g. the "Power Stick" battery from General Electric Company. In this embodiment coil spring 34a forms the electrical contact at one end of the battery stick to facilitate battery insertion into end caps 33. Also, the battery access door 32 of the platen 21 is elongated from the size shown in FIG. 1 so that the battery stick can be compressed against spring 34a and then released to engage the terminal 34 in the opposite end cap 33.

Figure 5:
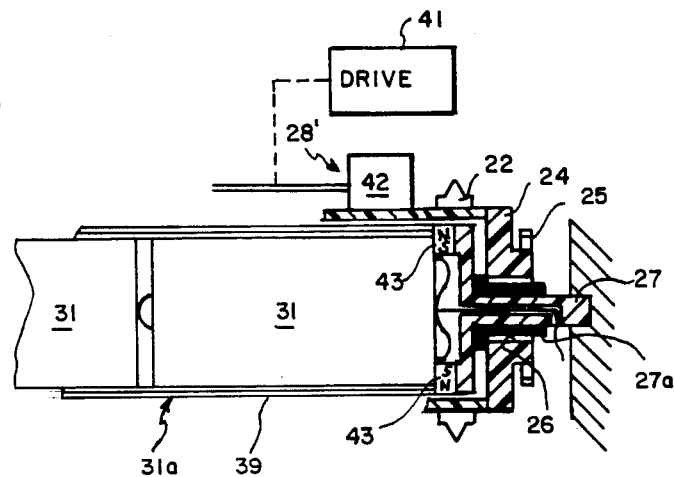
FIG. 5 is a cross-sectional view similar to FIG. 2, but showing an alternative embodiment of the present invention.

FIG. 5 shows another preferred embodiment wherein the batteries remain stationary during print media advance. In this construction the battery stick 31a, described with respect to FIG. 4, itself forms a platen over which print media is advanced. Tractor-fed paper advance is again effected by the rotation of sprocket 22; however, ordinary sheet feed is effected by means of a drive 41 coupled to the roller 42 of the bail system 28. In the FIG. 5 construction, the battery stick 31a is retained in a stationary operative relation with contacts 34 by magnetic couplings 43.

Figure 6:
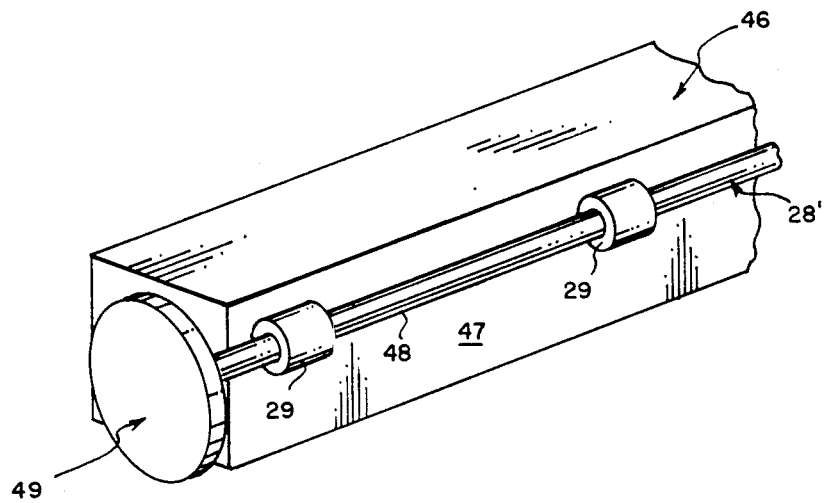
FIG. 6 is a partial perspective view showing an alternative embodiment of the present invention.

FIG. 6 illustrates another embodiment of the invention in which the bail assembly 28' is rotated to effect print medium advance. In this embodiment the battery housing 46 forms guide means having a guide surface 47 that directs the print medium into and out of the printing zone. The rollers 42 are driven via shaft 48 by drive gear 49, which can be coupled to the gear means 29 of the printer. The guide surface 47 is preferably coated with a low friction material. Thus, neither the batteries nor housing 46 rotate during operation. The member 46 can be a battery casing itself and, as shown, the battery configuration need not be cylindrical.

Figure 7:
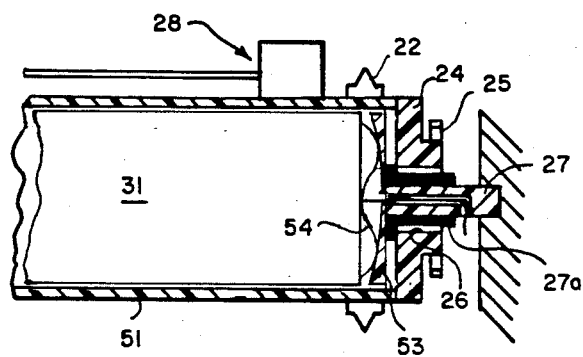
FIG. 7 is a cross-sectional view similar to FIG. 2, but showing an alternative embodiment of the present invention.
Figure 8:
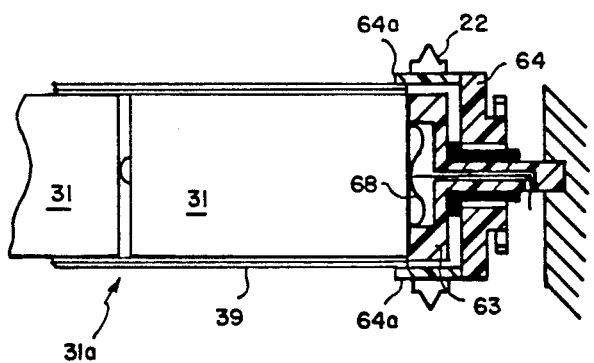
FIG. 8 is a cross-sectional view similar to FIG. 3, but showing an alternative embodiment of the present invention.

FIGS. 7 and 8 illustrate embodiments of the present invention wherein batteries rotate with the media transport system. In the FIG. 7 embodiment, the platen 51 is configured to support the batteries for rotation therewith, i.e., the separate support structure of FIGS. 2 and 3 has been eliminated. Instead, end caps 53 are constructed to support spring contacts 54 in brushing connection with the terminals of batteries 31 during rotation of the platen 51.

In the FIG. 8 embodiment, a battery stick 31a itself forms the rotative platen of the printer. In this embodiment end plates 64 have flanges 64a which are adapted to support the battery stick and to communicate rotative drive thereto. The stationary end caps 63 are again constructed to support spring contacts 68 in brushing electrical connection with the end terminals of the battery stick 31a.

Figure 10:
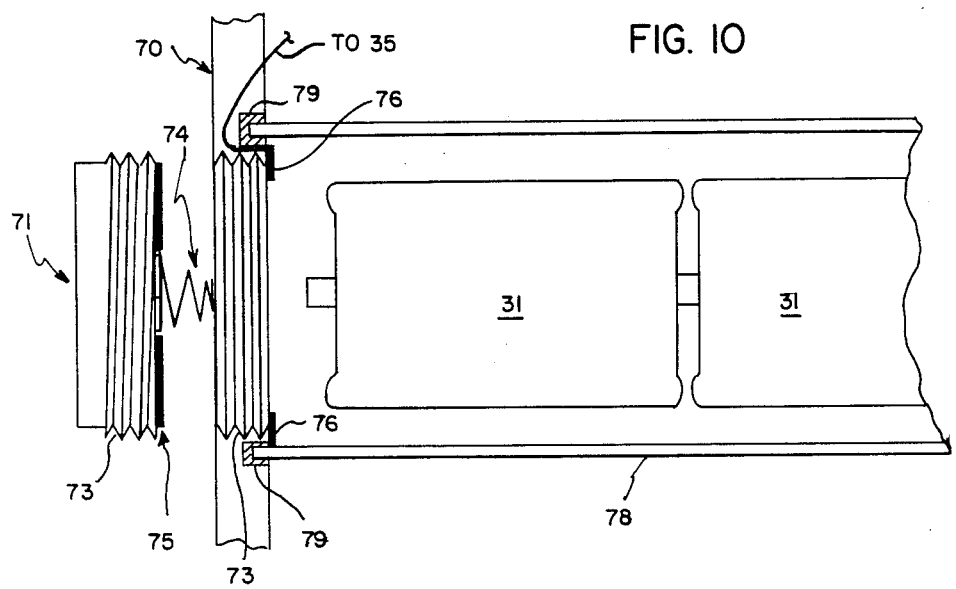
FIG. 10 is a cross-sectional view of a portion of the FIG. 9 embodiment.
Figure 9:
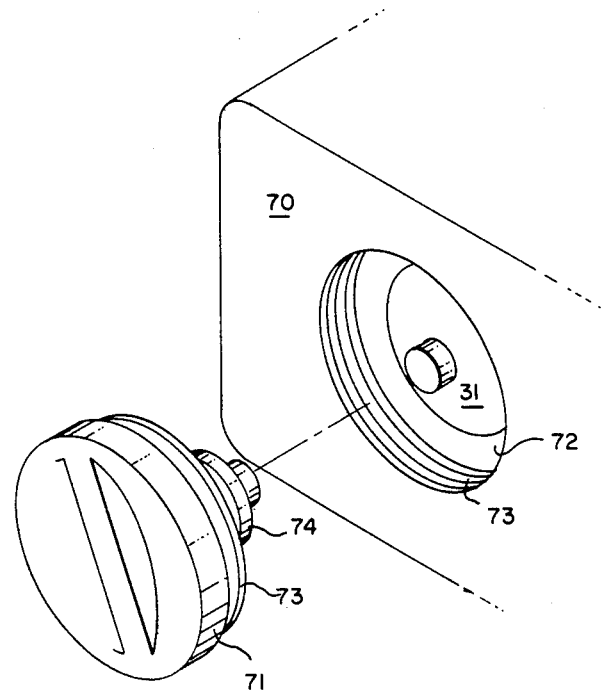
FIG. 9 is a partial perspective view showing another embodiment of the present invention.

FIGS. 9 and 10 show another embodiment of the invention wherein a plurality of individual batteries or a battery stick can be inserted into a rotatable platen from the side of the printer housing 70. Thus, a cap 71 is adapted to interfit with an opening 72 of the housing 70, for example by screw threads 73. Electrical connection of inserted batteries to power distribution system 35 is made by means of battery spring 74, which is coupled to contact ring 75 on cap 71. When cap 71 is in the interfitting engagement, ring 75 electrically connects to contact washer 76, which in turn is coupled to system 35. Platen-housing 78 is mounted at one end in bearing 79 and coupled at its other end to rotary drive, not shown.

FIGS. 11 and 12 disclose another embodiment of the present invention wherein a battery-stick platen 81 is removable from the printer, e.g. by means of a bottom access door 82. As shown in FIG. 12, tractor feed wheel 83 has a resilient seating recess 84 adapted to be secured on the end of battery stick 81. A coupling key portion 85 of feed wheel is adapted to interfit with drive gear 87, and the other end 86 of portion 85 is forced into electrical contact with the terminal of battery stick 81. The opposite end of battery stick 81 is similarly fitted with a tractor wheel 83', which has a bearing shaft adapted to seat in a bearing recess of the printer wall. When the battery stick with its fitted tractor feed wheels is inserted through the opening provided by door 82, the keyed portion 85 of wheel 83 interfits with a slot of gear 87. A spring/contact 88 urges gear outwardly from its bearing 89 in the printer wall. The spring is electrically coupled to an electrically conductive central portion of gear 86, which interfits with keyed portion 85, and to an electrical lead to power distribution system 35. A dielectric ring 90 is adhered to the wall around bearing recess 89 to prevent grounding of spring. After insertion of the battery stick unit into the printer, the unit is rotatable by printer drive means coupled to gear 87 and power is supplied by means of the above-described connections from conductive portions 85 and 86 of the tractor wheel. It will be appreciated that the same structural configurations can be used to removably mount a cylindrical housing for separate batteries rather than a battery stick. In such an arrangement the platen wheels can form caps on the cylindrical battery housing.

The invention has been described in detail with particular reference to preferred embodiments thereof, but it will be understood that variations and modifications can be effected within the spirit and scope of the invention.

I claim:

1. A portable printer of the type having a linear print zone and electrically powered printing and transport systems, said printer comprising:
    (a) a cylindrical platen extending across the width of said print zone for supporting and transporting successive portions of the print medium through said print zone, said platen having a longitudinal axis and a hollow interior;
    (b) means, located at the ends of said platen, for mounting said platen for rotation about its longitudinal axis;
    (c) an array of cylindrical batteries located within the hollow interior of said platen in an end-to-end, series connection, said array extending across at least a major portion of the width of said print zone;
    (d) circuit means for transmitting electrical power to at least one of said electrically powered systems; and
    (e) terminal means for coupling the ends of said array of batteries to said circuit means.

2. The invention defined in claim 1 wherein said array of batteries occupies a major portion of said hollow interior of said platen.

3. The invention defined in claim 1 further comprising door means constructed in the peripheral surface of said platen for enabling insertion and removal of said batteries, to and from said hollow interior of said platen.

4. The invention defined in claim 3 wherein said door means comprises a section of said platen and hinge means, located internally of the outer periphery of said platen, for pivotally mounting said platen section to adjacent platen portions.

5. In printer apparatus of the kind adapted to feed line portions of print media successively through a linear print zone and having a print carriage, which traverses adjacent said print zone to print lines on such print media, and a power distribution circuit, the improvement comprising:
    (a) print platen means including: (i) a cylindrical shell having a longitudinal dimension so as to be approximately coextensive with said linear print zone and a radius of sufficient dimension to support successive portions of print media during movement to, through and past the print zone and (ii) end bearing means constructed to support said shell for rotation about its longitudinal axis;
    (b) printer housing means, constructed to cooperate with said end bearing means, for rotatably supporting said platen means;
    (c) retaining means, located within the periphery of said shell, for retaining a plurality of batteries in electrical series connection along a major portion of the longitudinal dimension of said shell; and
    (d) means for electrically coupling the ends of such retained battery series to said power distribution circuit of said printer.

6. The invention defined in claim 5 wherein said retaining means includes a support shelf coupled to said printer housing and located within said shell so that said shell can rotate around said shelf.

7. The invention defined in claim 6 wherein said support shelf is coupled to said printer housing by portions of said housing means that extend through said end bearing means.

8. The invention defined in claim 5 wherein said electrical coupling means include terminal connections within said shell at each end of said platen and terminal leads extending through at least one of said end bearing means for said platen.

9. The invention defined in claim 5, 6, 7, or 8 further comprising door means, constructed in the peripheral surface of said shell intermediate said end bearing means of said platen, for allowing insertion and removal of batteries within said shell.

10. The invention defined in claim 5 or 6 wherein said retaining means includes spring means for urging such plurality of batteries into said end-to-end series connection.

11. In a sheet-type printer of the kind having power distribution means for providing electrical energy, sheet transport means and printing means for traversing a linear print zone and effecting sheet printing operations, an improved power-source/sheet-transport subsystem comprising:
    (a) platen having an inner diameter at least slightly greater than the diameter of "C" size batteries and a longitudinal dimension at least as long as the length of said linear sheet-printing zone;
    (b) a linear array of cylindrical batteries located in end-to-end electrical contact within said platen, said array extending within said platen along at least a major portion of said platen's longitudinal dimension;
    (c) means for mounting said shell for rotation about its longitudinal axis to advance successive line portions of a sheet into and past said sheet-printing zone; and
    (d) means for electrically coupling said linear battery array to said power distribution means.

12. The invention defined in claim 11 comprising means for mounting said battery array within said platen so as to rotate with said platen.

13. The invention defined in claim 12 wherein said battery array and said platen comprise portions of a battery stick package.

14. The invention defined in claim 11 further comprising means for supporting said array of batteries within said platen in spaced relation with said platen's inner periphery, whereby rotation of said shell is not imparted to said array.

15. The invention defined in claim 11, 12 or 14 wherein a section of said platen periphery is removable to allow insertion of said batteries into operative positions in said array supporting means.

* * * * *